(12) United States Patent
Der Stepanian et al.

(10) Patent No.: US 7,384,435 B1
(45) Date of Patent: Jun. 10, 2008

(54) PHYSICO-CHEMICAL METHOD FOR PREPARING AND TRANSFORMING PLANT WASTE AND RESULTING FUEL

(76) Inventors: Manouk Der Stepanian, 16, Bellevoie, Ch - 2800 Delémont (CH); Christian Assoun, c/Neutral Metal S.A., 14, rue du Rhône, Ch - 1204 (CH)

( * ) Notice: Subject to any disclaimer, the term of this patent is extended or adjusted under 35 U.S.C. 154(b) by 671 days.

(21) Appl. No.: 10/363,422

(22) PCT Filed: Aug. 31, 2000

(86) PCT No.: PCT/IB00/01217

§ 371 (c)(1),
(2), (4) Date: Jun. 13, 2004

(87) PCT Pub. No.: WO02/18520

PCT Pub. Date: May 7, 2002

(51) Int. Cl.
*C10L 5/12* (2006.01)
*C10L 5/40* (2006.01)

(52) U.S. Cl. .......................... 44/559; 44/563; 44/589; 44/590; 44/605; 44/606

(58) Field of Classification Search .................. 44/559, 44/563, 589, 590, 605, 606, 554
See application file for complete search history.

(56) References Cited

U.S. PATENT DOCUMENTS

| 1,396,603 | A | * | 11/1921 | Stearly | 44/559 |
| 1,995,366 | A | * | 3/1935 | Snell | 44/555 |
| 4,529,407 | A | * | 7/1985 | Johnston et al. | 44/553 |
| 5,910,454 | A | | 6/1999 | Sprules | |

FOREIGN PATENT DOCUMENTS

| EP | 0 193 666 | 9/1986 |
| WO | WO 95/35354 | 12/1995 |

* cited by examiner

*Primary Examiner*—Cephia D. Toomer
(74) *Attorney, Agent, or Firm*—McGlew and Tuttle P.C.

(57) ABSTRACT

The invention concerns a method for preparing organic waste, such as coffee grounds (12), so as to eliminate it by combustion. Said method consists in mixing the waste (12) with a silicic acid additive (14), the proportion of additive ranging between 3 and 5% to constitute a fuel.

14 Claims, 1 Drawing Sheet

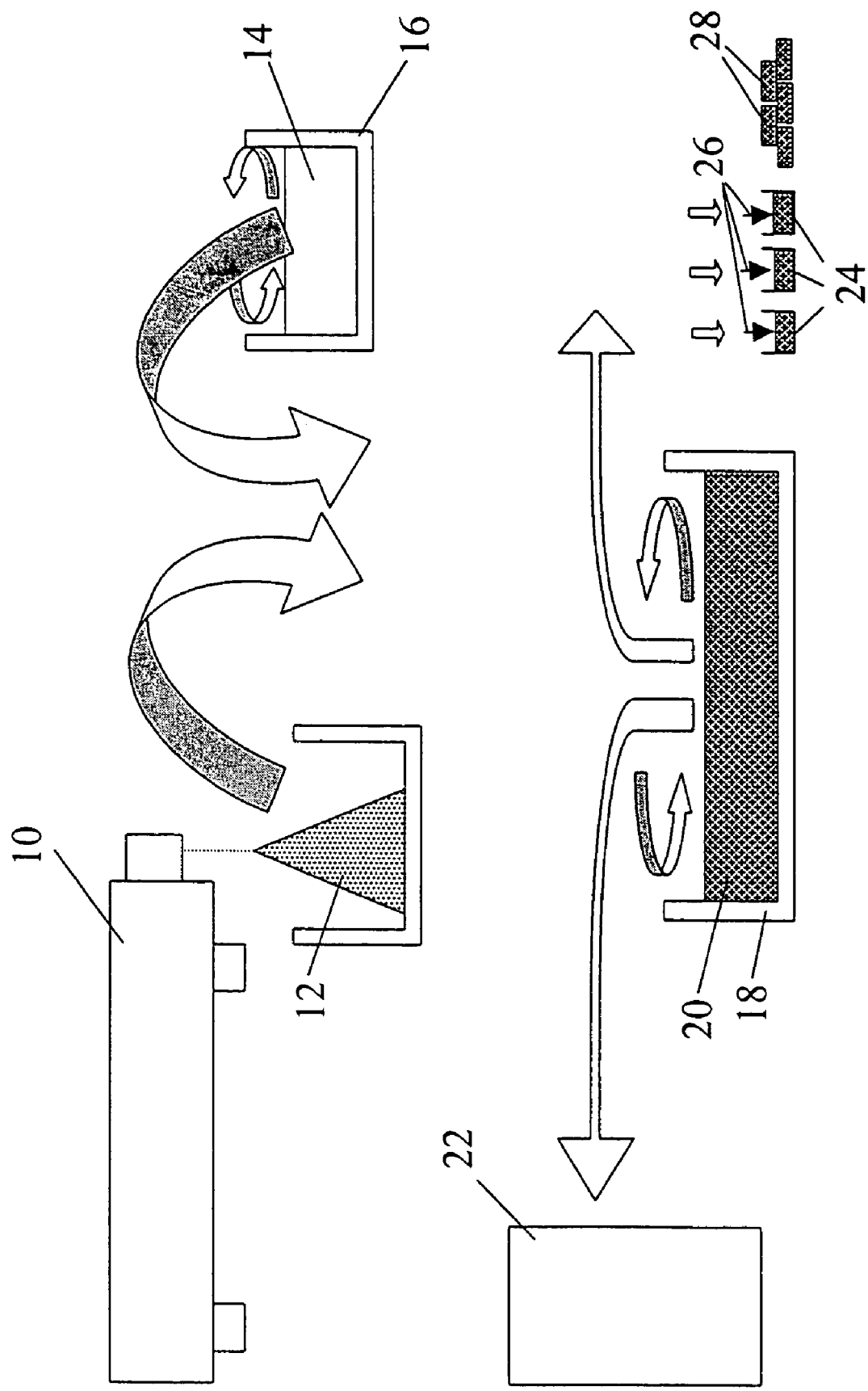

PHYSICO-CHEMICAL METHOD FOR PREPARING AND TRANSFORMING PLANT WASTE AND RESULTING FUEL

BACKGROUND OF THE INVENTION

The present invention relates to the disposal of plant waste, and particularly coffee grounds. Plant waste here referring to vegetative matter from biological plants. Those skilled in the art have known, for numerous years, how to manufacture a water-soluble powder, particularly by freeze-drying, commonly called instant coffee. It goes without saying that after having extracted from the coffee those constituents that form the water-soluble powder, waste remains, in the form of grounds, which has to be disposed of. Several solutions can be envisaged. It is, for example, possible to make the grounds into compost. This takes a certain amount of time and requires large storage areas. It is also possible to burn them. In such case, they have to be dried, either in a furnace, which consumes energy, or in the open air, which takes time, since coffee grounds contain between 17 and 20% water. Consequently, space is required for storage.

SUMMARY OF THE INVENTION

It is an object of the present invention to allow fast, economical and ecological disposal of such waste. This object is achieved owing to the fact that, according to the invention, plant waste, which has a granular, fibrous or flaky structure, is mixed, prior to combustion, with a silicic acid based additive, the proportion of additive being comprised between 3 and 5% of the final weight prior to combustion.

Advantageously, the additive and plant waste form a mixture that is then compressed to form blocks, like briquettes or fuel logs.

The present invention also concerns a fuel formed of a mixture of 95 to 97% organic waste and a silicic acid based additive.

This additive has proved particularly efficient when it is formed half of silicic acid and the remainder of methyl cellulose, cellulose and silica.

More precisely, the additive includes approximately 60% by weight of silicic acid and silica, whereas the cellulose and methyl cellulose represent around 40%, for example around 50% silicic acid, 25% methyl cellulose, 15% cellulose and 10% silica.

In order to facilitate handling of the fuel, it takes the form of briquettes or fuel logs. The use of coffee grounds as organic waste proves particularly well suited.

BRIEF DESCRIPTION OF THE DRAWING

Other advantages and features of the invention will appear from the following description, made with reference to the annexed drawing, in which the single Figure shows schematically the various steps of the method according to the invention.

DESCRIPTION OF A PREFERRED EMBODIMENT

During preparation of the coffee, the aromas are extracted in a machine shown schematically at 10. Grounds 12, generally containing 17 to 20% of water come out of the machine. These grounds cannot be directly disposed of by combustion, because of this large proportion of water.

Further, an additive 14 is produced in a first vessel 16 by stirring powders of silicic acid (around 50%), silica (around 10%), methyl cellulose (around 25%), and the remainder of cellulose, until a homogenous mass is obtained. This operation typically lasts for one to two hours to obtain around a hundred kilos of additive 14. In the additive, the silicic acid part is determined so as to optimize the burning capability of the mixture. This part is greater the higher the concentration of water in grounds 12.

Coffee grounds 12 are introduced into a second vessel 18, of larger dimensions, and weighed. 3 to 5% by weight of additive 14 is then added. This is then stirred until a mixture 20 having a consistency close to sawdust is obtained. This also requires one to two hours. Mixture 20 can then burned in a boiler, schematically shown at 22, of the type using sawdust as fuel.

If mixture 20 has to be stored or handled, it is advantageous to compact it. For this purpose, it is introduced into moulds 24 and subjected, by means of a press represented by arrows 26, to a pressure comprised between 50 and 400 kN per $cm^2$, typically 200 kN per $cm^2$. Briquettes or fuel logs 28, which can be stacked, are thus obtained.

It is evident that the additive does not allow the water contained in the grounds to be eliminated. It seems to fix the water by adsorption and absorption, such that it no longer limits ignition of the grounds. Further, it appears that the presence of water increases heat conduction, such that the mass of the mixture heats up more quickly and thus burns more easily.

The ashes thereby obtained can then be used as a silicic additive, for example in agriculture.

The embodiment described hereinbefore permits disposal of coffee grounds. It is also applicable to other types of organic matter such as the waste, obtained after a pressing operation, like for example olive or sugarcane waste.

What is claimed is:

1. A method for preparing vegetative waste, in a granular, fibrous or flaky structure for disposal by combustion, including the step of mixing said vegetative waste with a silicic acid based additive comprising half silicic acid and the remainder is methyl cellulose, cellulose and silica, the additive comprising between 3 and 5% of the final weight of the vegetative waste prior to combustion.

2. A method according to claim 1, wherein the additive and the vegetative waste, in a granular, fibrous or flaky structure form a mixture which is then compressed to form blocks.

3. A fuel formed of a mixture of 95 to 97% vegetative waste, in a granular, fibrous or flaky structure, and a silicic acid based additive comprising half silicic acid and the remainder is methyl cellulose, cellulose and silica.

4. A fuel according to claim 3, wherein said additive is formed of around 60% by weight of silicic acid and silica, whereas the cellulose and methyl cellulose represent 40%.

5. A fuel according to claim 4, wherein said additive comprises around 50% silicic acid, 25% methyl cellulose, 15% cellulose and 10% silica.

6. A fuel in accordance with claim 3, wherein:
said vegetative waste includes water in an amount preventing direct combustion of said vegetative waste.

7. A fuel in accordance with claim 6, wherein:
said water in said vegetative waste is in a concentration of 17 to 20%.

8. A fuel in accordance with claim 3, wherein:
said vegetative waste is one of coffee ground waste, olive waste and sugarcane waste.

9. A method in accordance with claim 1, wherein:
said vegetative waste includes water in an amount preventing direct combustion of said vegetative waste.

10. A method in accordance with claim 9, wherein:
said water in said vegetative waste is in a concentration of 17 to 20%.

11. A combustion fuel comprising: 95 to 97% organic vegetative matter including water in an amount preventing direct combustion of said organic vegetative matter and a silicic acid based additive comprising half silicic acid and the remainder is methyl cellulose, cellulose and silica.

12. A combustion fuel in accordance with claim 11, wherein:
said water in said organic matter is in a concentration of 17 to 20%.

13. A combustion fuel in accordance with claim 11, wherein:
said additive comprises around 60% by weight of silicic acid and silica, whereas said cellulose and methyl cellulose represent 40%.

14. A combustion fuel in accordance with claim 11, wherein:
said additive comprises around 50% silicic acid, 25% methyl cellulose, 15% cellulose and 10% silica.

* * * * *